United States Patent [19]

Beckmann

[11] 4,024,474

[45] May 17, 1977

[54] CIRCUIT ARRANGEMENT FOR WIRELESS TRANSMISSION OF A CONTROL SIGNAL TO THE CONTROL PATH OR A CONTROLLABLE SEMICONDUCTOR VALVE, IN PARTICULAR A THYRISTOR

[75] Inventor: Oskar Beckmann, St. Polten, Austria

[73] Assignee: Siemens Aktiengesellschaft, Munich, Germany

[22] Filed: Apr. 7, 1975

[21] Appl. No.: 565,679

[30] Foreign Application Priority Data

Apr. 8, 1974 Germany .................. 2416923

[52] U.S. Cl. ............................ 325/37; 325/48; 325/30; 325/392; 340/171 R; 343/225

[51] Int. Cl.[2] ............................ H04B 1/00

[58] Field of Search ............ 325/30, 37, 39, 40, 325/48, 47, 59, 60, 163, 320, 390, 392; 178/66 R, 66 A; 340/171 A, 171 R, 171 PF; 343/225–228

[56] References Cited

UNITED STATES PATENTS

| | | | |
|---|---|---|---|
| 2,839,604 | 6/1958 | Shank | 178/66 A |
| 3,142,723 | 7/1964 | Fleming | 178/66 A |
| 3,160,812 | 12/1964 | Scantlin | 325/39 |
| 3,521,267 | 7/1970 | Lester et al. | 325/37 |
| 3,522,536 | 8/1970 | Reynolds | 325/37 |
| 3,638,174 | 1/1972 | Haase et al. | 325/37 |
| 3,683,278 | 8/1972 | Ohnsorge et al. | 325/30 |
| 3,747,108 | 7/1973 | Ringer | 325/37 |
| 3,823,385 | 7/1974 | Kitamura | 325/30 |

Primary Examiner—Benedict V. Safourek
Assistant Examiner—Jin F. Ng
Attorney, Agent, or Firm—Kenyon & Kenyon Reilly Carr & Chapin

[57] ABSTRACT

A circuit arrangement for the wireless transmission of a control signal to the control path of a controllable semiconductor valve, in particular a thyristor, is disclosed. The arrangement comprises a high-frequency transmitter in which a high frequency carrier signal is modulated by the output of a modulator. The latter modulator is responsive to the control signal and develops an output signal which includes first and second subcarrier signals having different subcarrier frequencies. Specifically, the output comprises the first subcarrier when the control signal is in a condition associated with the ignition state of the valve and comprises the second subcarrier when the control signal is in a condition associated with the extinguished state of the valve.

The circuit additionally includes a high frequency receiver which receives the high frequency carrier and recovers therefrom the aforesaid modulator output. The portion of such output comprising the first subcarrier frequency is then used to ignite the semiconductor valve, while the portion thereof comprising the second subcarrier frequency is used to extinguish or block ignition of the valve.

7 Claims, 4 Drawing Figures

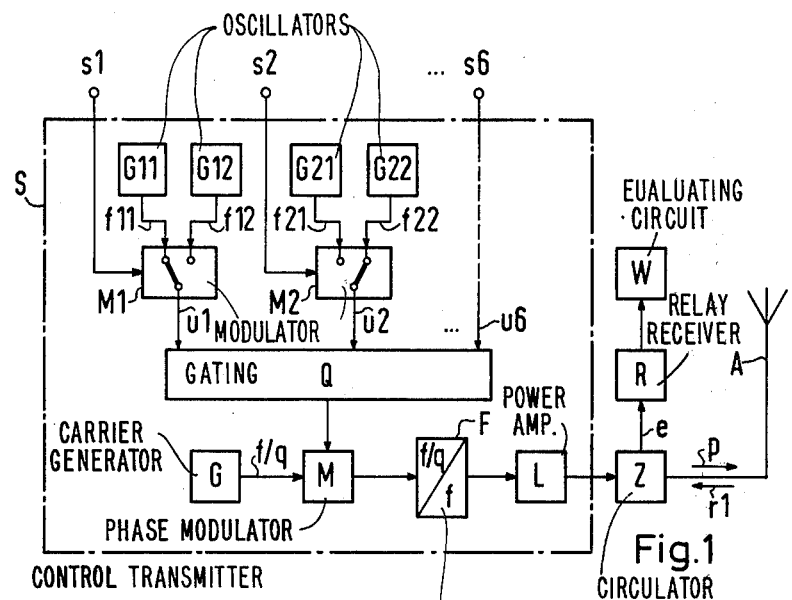
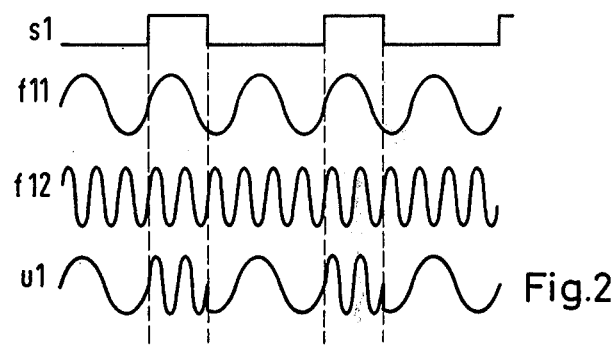
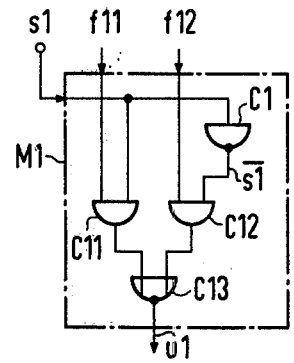
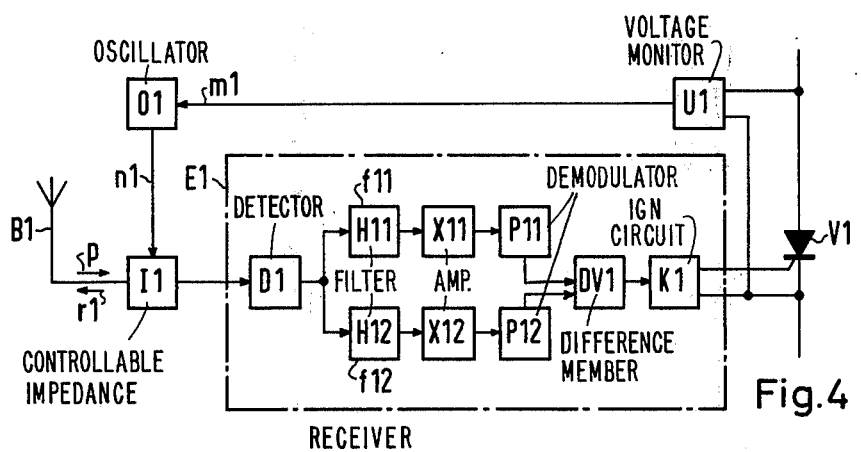

CIRCUIT ARRANGEMENT FOR WIRELESS TRANSMISSION OF A CONTROL SIGNAL TO THE CONTROL PATH OR A CONTROLLABLE SEMICONDUCTOR VALVE, IN PARTICULAR A THYRISTOR

BACKGROUND OF THE INVENTION

1. Field of the Invention

The invention relates to a circuit arrangement for the wireless transmission of a control signal to the control path of a controllable semiconductor valve and, in particular, a circuit arrangement in which the control signal is used to modulate a high frequency transmitter whose transmitted carrier is received by a high frequency receiver which comprises a demodulator whose output signal is applied to the control path of the semiconductor valve.

2. Description of the Prior Art

In the above-type of circuit arrangement, the control signal is, typically, first applied to a first modulator where it amplitude-modulates a subcarrier signal. The subcarrier signal is then used to modulate, via a second modulator, a high-frequencycarrier signal which, after modulation, is transmitted to the receiver. At the receiver, first the carrier and then the sub-carrier are demodulated and the resultant signal applied to the valve being controlled. A particular circuit arrangement of this type is known from Swiss Pat. No. 413,933.

Typically, the amplitude modulated sub-carrier signalin the above arrangement comprises, per cycle of the control signal, a signal packet of the sub-carrier frequency, which has, for example, a length of 120 electrical degrees and is associated with the ignition state of the semiconductor valve, and zero or currentless interval, which, for example, has a length of 240 electrical degrees and is associated with the cutoff state of the semiconductor valve. Viewed over several cycles, therefore, the amplitude-modulated sub-carrier signal comprises a series of signal packet and currentless intervals. At the receiver, the occurrence of a signal packet indicates that the respective semiconductor valve is to be ignited, while the occurrence of a currentless interval indicates that the respective semiconductor valve is to be extinguished.

During the aforesaid currentless intervals, the interference signals resulting from external or internal disturbances, e.g., interference voltages in the modulator, irradiation from outside the high-frequency transmitter, switching operations, or corona discharges at the semiconductor valves, often lead to an unintended ignition of the semiconductor valve at the receiver.

It is thus a primary object of the present invention to improve the above-mentioned circuit arrangement's immunity to interference.

SUMMARY OF THE INVENTION

In accordance with the principles of the present invention, the above and other objectives are realized by including in the above-described circuit arrangement another or second subcarrier signal which along with the first subcarrier signal is applied to the first modulator which acts as a frequency shifting device. More particularly, the second subcarrier signal is of a different frequency than the first signal, and the first modulator responds to the control signal so that its output comprises the first subcarrier when the control signal is in a condition associated with the ignition state of the semiconductor valve and the second subcarrier when the control signal is in a condition associated with the extinguished state of the valve. The output of the first modulator thus switches between the two subcarriers in accordance with the changes in condition of the control signal and, hence, with the associated desired changes in the state of the semiconductor valve.

At the receiver, additional means is provided in the circuit arrangement for recovering the first modulator output and for using the first subcarrier portion thereof for igniting the semiconductor valve, and the second portion thereof for extinguishing or blocking such valve.

In one embodiment of the invention, two separate frequency generators are provided at the transmitter for the two subcarrier signals. In principle, however, it should be pointed out that the generation of such signals could also be carried out by a single frequency generator whose output signal is divided into two subcarrier signals by difference frequency division or frequency multiplication.

In the aforesaid embodiment, the first modulator comprises a frequency shifting device which is in the form of a logic circuit. Specifically, the circuit includes a first AND member energized by the first subcarrier signal and by the control signal, a second AND member energized by the second subcarrier signal and by the inverted control signal, and an OR member connected to the AND members for provided the desired frequency shifted output signal.

In this embodiment, moreover, the apparatus at the receiver for evaluating, processing and utilizing the additional first and second subcarrier signal includes a detector which acts as a carrier frequency demodulator and feeds two branches, one of which is tuned to the first subcarrier frequency and the other to the second subcarrier frequency. In particular, each of the aforesaid branches comprises a filter tuned to the respective subcarrier frequency and an after-connected amplitude demodulator. In addition, in each branch a limiting amplifier is arranged between the filter and the amplitude demodulator. Once derived, the output signals of both branches are fed into a difference member which is connected to the input of the ignition circuit controlling the semiconductor valve. The difference member employed may be a difference amplifier and the ignition circuit a bistable logic circuit.

DESCRIPTION OF THE DRAWING

An embodiment of the invention will be explained more fully in the following description which makes reference to the following drawings, in which:

FIG. 1 shows a transmitter portion of a circuit arrangement in accordance with the principles of the present invention;

FIG. 2 illustrates waveform diagrams of four of the signals developed in the transmitter of FIG. 1;

FIG. 3 shows a particular modulator which can be employed as the frequency-shift modulator of FIG. 1; and FIG. 4 shows a receiver portion of a circuit arrangement in accordance with the invention.

DETAILED DESCRIPTION

FIG. 1 shows, schematically a control transmitter S which receives, via an input terminal a control signal S1 for controlling the ignition of a semiconductor valve V1 (shown in FIG. 4) which, typically, might be a thyristor. As illustrated, the signal S1 is being used to control just the one semiconductor valve V1, but, as can be appreciated, it might also be used to control several semiconductor valves connected in series or in parallel. Via five additional input terminals, there are applied to the control transmitter S the additional control signals S2 . . . S6 which are staggered in time and which serve to ignite additional semiconductor valves (not shown) or groups of such semiconductor valves. It is assumed herein that all of aforesaid semiconductor valves are included in the same high voltage current converter, e.g. the same current converter for high-voltage d.c. transmission, but that they are arranged in different branches of the three-phase a.c. bridge circuit of such converter and are to be ignited at different ignition times.

In response to the signals S1 to S6, the control transmitter S generates a transmission signal p which might, for example, be in the GHz range. The transmission signal p is coupled by a circulator Z from the transmitter S to an antenna A. The latter antenna then transmits the signal by radio waves to a number of receiving antennas, of which only the receiving antenna B1 is shown in FIG. 4. Generally, each of the semiconductor valves at the receiver will have a receiving antenna similar to B1 associated with it.

As shown in FIG. 4, the receiving antenna B1 together with a receiver E1 are associated with the semiconductor valve V1. The receiver E1 has the property that from a plurality of received control signals it selects the control signal S1 associated with it, and dependent on this control signal S1, sends an ignition signal to the control path of the semiconductor valve V1.

Connected between the receiving antenna B1 and the receiver E1 is a controllable impedance member I1 such as, for example, a tuning diode or a PIN diode. The impedance of member I1 is modulated by an assigned frequency oscillator 01 having an assigned frequency $n1$ which is an identification for the semiconductor valve V1.

The transmission signal p received by the receiving antenna B1 is coupled, via the impedance member I1, into the receiver E1 and is demodulated therein. At this point, a verification is made as to whether the demodulated signal is the proper control signal for controlling the ignition of valve V1. If it is the signal will be coupled to the valve for exercising control thereover.

The assigned frequency oscillator 01 reports back information about the state of the semiconductor valve V1. This information is furnished to the oscillator by a voltage monitoring circuit U1 which measures the anode-cathode voltages of the semiconductor V1. If the anode-cathode voltage is zero, that is, if there is interference, the voltage monitoring circuit U1 delivers as an output signal m1 a blocking signal to the assigned frequency oscillator 01. This blocking signal m1 blocks the output voltage of the assigned frequency oscillator 01.

In the undisturbed case, however, when a blocking voltage is connected at the semiconductor valve V1, the voltage monitoring circuit U1 delivers no blocking signal. The assigned frequency oscillator 01 then varies the impedance value of the associated impedance member I1 according to the assigned frequency $n1$. This variation in the impedance I1 causes the arriving transmission signal p to be modulated and partly reflected so that an amplitude modulated signal is returned to the antenna B1 where it is re-radiated as a reply signal R1. The latter signal, in turn, is carried via the transmission path to the transmitting antenna A at the transmitter S. Also, it should be noted that reply signals associated with the additional semiconductor valves located at the receiver are similarly transmitted and received at the transmitter.

The mixture of reply signals received by the transmitting antenna A are conducted, via the circulator Z, as a receiver signal $e$ into a reply receiver R. The latter receiver R selects the reply signals reflected by all receiving antennas in modulated form according to their assigned frequencies. If the semiconductor valve V1 is disturbed, the respective assigned frequency $n1$ missing in the receiving signal $e$. An evaluating circuit W processes the signals delivered by the reply receiver R, so that one obtains information about the code number, location and/or number of defective semiconductor valves.

In the discussion which follows, the operation of the control transmitter S and receiver E1 are described in greater detail. To simplify the discussion, it is assumed that the signals S1 to S6 comprise, per cycle, a non-zero-interval of 120° and a zero interval of 240° and that they are phase-shifted by 60° relative to each other. It is further assumed, moreover, that the zero interval condition of each of such signals corresponds to an on or ignition period of the valve associated with the signal, while the non-zero interval condition corresponds to a blocked or extinguished period of such valve.

As shown in FIG. 1, the control transmitter S comprises a frequency generator G11, e.g. a quartz oscillator, which delivers a first subcarrier signal, for example, a sinusoidal signal having a constant first subcarrier frequency f11. The latter frequency typically, might be in the range from 6.7 to 11 MHz. For the present discussion, it is assumed to be equal to 5.5 MHz. The control transmitter S also comprises a correspondingly constructed additional or second frequency generator G12 which delivers an additional or second subcarrier signal of a given second subcarrier frequency $f12$. This additional subcarrier frequency $f12$ is different from the subcarrier frequency $f11$ and is assumed to be equal to 6.6 MHz. The subcarrier signal of subcarrier frequency $f11$ is associated with the ignition state and the additional subcarrier signal of subcarrier frequency $f12$ with the cutoff state of the semiconductor valve V1. Both subcarrier signals are supplied to a modulator M1 which is designed as a frequency shifting device and is, in principle, a two-position switch. As will be explained hereinbelow, the modulator M1 may be designed as an electronic switch comprised of logic elements.

The control signal S1 is supplid to the modulation input of the modulator M1 to control its operation on the two applied subcarrier signals. According to the control signal S1, the modulator M1 switches the two subcarrier signals forward so as to form a frequency-shifted subcarrier signal u1. The frequency shifted subcarrier signal u1 delivered by the modulator M1 is a signal which, for the non-zero interval of each cycle of the signal S1 comprises a signal packet of the subcarrier frequency f11 and, for the zero interval of each such cycle, comprises a signal packet of the additional subcarrier frequency $f12$.

In the diagrams of FIG. 2, the waveforms of the control signal S1, of the subcarrier signals with the subcarrier frequencies $f11$ and $f12$ and the frequency-shifted subcarrier signal $u1$ are illustrated. As can be seen, there are no voltageless or currentless intervals in the time curve of the frequencyshifted subcarrier $u1$. The latter signal comprises a series of ignition signals ($f11$ intervals) and blocking signals ($f12$ intervals). As a result, compared with a signal with voltageless or currentless intervals, the signal $u1$ results in a transmitted signal whose signal-to-noise ratio is greatly improved. In particular, in the case of a signal with voltageless or currentless intervals, the resultant signal is radiated by antenna A with little or no power during such intervals. Thus, during their occurrence, an interference signal of small amplitude arriving at the receiver could lead to an unintended ignition of the semiconductor valve V1. Such an interference signal may be caused, for example, by an interference voltage in the modulator M1, by the irradiation of foreign high-frequency transmitters, by switching operations, or by a corona discharge on a semiconductor valve of the current converter. When using the frequency-shifted subcarrier signal $u1$, on the other hand, a blocking signal (i.e. subcarrier $f12$) is transmitted during the otherwise voltageless or currentless intervals. This signal differs sufficiently from the interference signal so that it reliably blocks the semiconductor valve V1 from being ignited.

FIG. 3 shows a form of the modulator M1 which is comprised of logic elements. More particularly, as shown, the modulator M1 comprises an AND member or gate C11 to which is applied the signal S1 and the subcarrier signal $f11$. It further comprises a second AND member or gate C12 which is energized by the additional subcarrier signal $f12$ and by the inverted control signal S1. For the reversal of the control signal S1 an inverter member C1 is provided. The two AND members C11 and C12 are connected on their output sides to an OR member or gate C13. At the output of the latter gate appears the frequency shifted subcarrier signal $u1$.

As above indicated, the additional control signals S2 to S6 are provided to ignite other semiconductor valves (not shown) at the receiver location. As shown in FIG. 1, at the transmitter each of these control signals acts on a frequency generator-modulator combination similar to the combination provided for the signal S1. The control signal S2 is applied, for example, into the modulator input of a modulator M2 which is energized by frequency generators G21 and G22 with subcarrier signals of the subcarrier frequencies $f21$ and $f22$. The individual frequency generators G11, G12, G21 and G22 generate different subcarrier frequencies $f11$, $f12$, $f21$ and $f22$.

As shown, the output voltages of all the aforesaid modulators M1, M2 are combined, i.e. added, by a mixing member or gating point Q which may, for example, be designed as a resistor or as logic OR member. The output voltages combined at the gating point Q are supplied to a phase modulator M.

The phase modulator M is preceded by a carrier generator G which may, for example, be designed as a quartz oscillator which delivers a carrier signal of a constant frequency $f/q$ of 51 MHz. The carrier signal delivered by the carrier generator G is frequency-modulated in the phase modulator M by the sum signal at the gating point Q, the latter sum signal being applied to the modulation input of the modulator. The frequency modulated output signal of the phase modulator M is supplied to a frequency multiplier F. This frequency multiplier F may have, for example, a multiplication factor $q = 48$. The frequency of the carrier generator $f/q$ is thereby increased by the factor $q$ to the frequency value $f$. Thus, there appears at the output of the frequency multiplier F a signal which has, for example, a carrier frequency $f$ of 2448 MHz. This signal is amplified by a power amplifier L to the necessary output power level e.g. 2 W. The output signal of the power amplifier L forms the transmission signal $p$ which, as above indicated, is applied to the transmitting antenna A via the circulator Z.

As shown in FIG. 4, the transmission signal $p$ is received by the receiving antenna B1 and then coupled, via the controllable impedance member I1, into the receiver E1. At the latter, it is applied to a ratio detector or, generally, a detector D1 which operates to demodulate the carrier frequency $f$. The output signal of the detector D1 is then supplied, simultaneously, to two circuit branches of similar construction, the upper branch being tuned to the subcarrier frequency $f11$ and the lower branch to the subcarrier frequency $f12$. The output signal of the upper branch is provided for the ignition of and the output signal of the lower branch for the blocking of, or more precisely, for preventing the ignition of, the semiconductor valve V1.

More specifically, the upper branch comprises a filter H11, which is tuned to the subcarrier frequency $f11$, an afterconnected amplifier $x11$, which acts as a limiter and, lastly, an amplitude demodulator P11, which may comprise a single diode. Similarly the lower branch comprises a filter H12, which is tuned to the additional subcarrier frequency $f12$, an after-connected amplifier $x12$ also acting as a limiter and, lastly, an amplitude demodulator $p12$, e.g. a diode.

As can be appreciated, the filter H11 passes an appreciable signal only when subcarrier $f11$ is present. Thus, the output from the amplifier $x11$ being fed by such filter comprises the subcarrier $f11$ amplitude-modulated in the rhythm of the nonzero intervals of the control signal S1. The filter H12, on the other hand, passes an appreciable signal only when the subcarrier $f12$ is present. Hence, the output of the amplifier $x12$ being fed by the latter filter, comprises the subcarrier $f12$ amplitude-modulated in the rhythm of the zero intervals of the control signal S1.

The aforesaid outputs of amplifiers $x11$ and $x12$, after demodulation in the respective demodulators P11 and P12, are fed into a difference member DV1, which may be designed as a difference amplifier. A positive output signal from the member DV1 indicates that the demodulated signal from demodulator P11 is not equal to zero or is greater than the signal from the demodulator P12. Such an output thus corresponds to a non-zero interval of the signal S1 and, when applied to the ignition circuit K1, causes the latter circuit to fire valve V1. A negative output signal from the member DV1, on the other hand, indicates that the demodulated output from demodulator P12 is not equal to zero or is greater than the output from demodulator P11. Hence, this type of output corresponds to a zero interval of S1, and, in turn, upon application to the circuit K1 causes such circuit to block the ignition of valve V1.

The ignition circuit K1 may be designed as a bistable stage or Schmitt trigger. Moreover the difference member DV1 and the ignition circuit K1 may be combined in a single component such as a difference amplifier having a very high gain. Employing a bistable stage as ignition circuit permits the forming of a rectangular ignition pulse wave form for the semiconductor valve V1.

What is claimed is:

1. A circuit arrangement for the wireless transmission of a control signal to the control path of a semiconductor valve in a high voltage current converter comprising:
   a. means for simultaneously generating first and second subcarrier signals having first and second subcarrier frequencies which are different from zero and different from each other and which are constant;
   b. means for generating a high frequency carrier signal;
   c. a first modulator responsive to the control signal and said first and second subcarrier signals for generating a frequency shift output signal, said output signal comprising only said first constant frequency signal when said control signal is in a condition associated with the ignition state of said valve and said second constant frequency signal when said control signal is in a condition associated with the extinguished state of said valve;
   d. a second modulator responsive to said high frequency carrier and said frequency shift output signal for developing a high frequency output signal;
   e. means for wirelessly transmitting said high frequency output signal; and
   f. means for receiving said high frequency output signal comprising:
   1. a detector responsive to said high frequency output signal for demodulating said signal;
   2. a first circuit branch including a filter tuned to said first subcarrier frequency and an amplitude demodulator connected to the output of said filter for developing an output signal for igniting said valve;
   3. a second circuit branch including a filter tuned to said second subcarrier frequency and an amplitude demodulator connected to the output of said filter for developing an output signal for blocking the ignition of said valve;
   4. a difference circuit responsive to the output signals from said first and second branches; and
   5. an ignition circuit whose input is connected to the output of said difference circuit and whose output is connected to said control path.

2. A circuit arrangement in accordance with claim 1 in which said means for generating said first and second signals includes first and second frequency generators, respectively.

3. A circuit arrangement in accordance with claim 1 in which each of said branches further includes a limiting amplifier disposed between said filter and said amplitude demodulator.

4. A circuit arrangement in accordance with claim 1 in which said ignition circuit includes a bistable circuit.

5. A circuit arrangement according to claim 1 for transmission of at least two control signals to the control paths of at least two valves and further including at least two each of said means for generating first and second subcarrier signals, first modulator, and means for receiving, each of said first modulators having associated therewith a separate control signal for transmission to the control path of a separate semiconductor valve in the high voltage current converter, each of said control signals occurring displaced in time with respect to all others, and further including mixing means having as inputs the outputs of each of said first modulators and providing a signal output to said second modulator.

6. A circuit arrangement in accordance with claim 1 in which said first modulator comprises logic elements.

7. A circuit arrangement in accordance with claim 6 in which said first modulator comprises:
   a first AND gate responsive to said control signal and said first signal:
   a second AND gate responsive to the inverted control signal and said second signal;
   and an OR gate connected to the outputs of said first and second AND gates.

* * * * *